United States Patent [19]

Poquette, Jr.

[11] 4,245,498
[45] Jan. 20, 1981

[54] WELL SURVEYING INSTRUMENT SENSOR

[75] Inventor: Raymond S. Poquette, Jr., Glen Ridge, N.J.

[73] Assignee: The Singer Company, Little Falls, N.J.

[21] Appl. No.: 966,922

[22] Filed: Dec. 6, 1978

[51] Int. Cl.³ .......................................... E21B 47/022
[52] U.S. Cl. ......................................... 73/151; 33/313
[58] Field of Search .................. 73/151, 504; 33/313, 33/323, 312, 318

[56] References Cited

U.S. PATENT DOCUMENTS

| | | | |
|---|---|---|---|
| 3,229,533 | 1/1966 | Draper et al. | 33/323 UX |
| 3,242,744 | 3/1966 | Fischel | 33/323 UX |
| 3,587,175 | 6/1971 | Armistead | 33/313 X |
| 4,071,959 | 2/1978 | Russell et al. | 33/313 X |

FOREIGN PATENT DOCUMENTS 120795  9/1959  U.S.S.R. ................................... 33/313

Primary Examiner—Jerry W. Myracle
Attorney, Agent, or Firm—J. C. Altmiller; T. W. Kennedy

[57] ABSTRACT

A surveying instrument sensor which includes a gimbal supported for rotation within a casing, a torquer coupled to rotate the gimbal with a first two-axis flexure suspended gyro supported on the gimbal with its spin axis perpendicular to the axis of the gimbal and one of its sensitive axes aligned with the axis of the gimbal, a second two-axis flexure suspended gyro disposed on the gimbal with its spin axis alinged with the axis of the gimbal and having two sensitive axes outputs orthogonal thereto. The output of the first gyro is coupled to the torquer to form a gimbal stabilized loop and the outputs and torquing inputs of the second gimbal coupled into rate capture loops with output signals obtained from the rate captured loops permitting fast and accurate surveying of a well pipe.

9 Claims, 3 Drawing Figures

WELL SURVEYING INSTRUMENT SENSOR

BACKGROUND OF THE INVENTION

This invention relates to surveying instrument sensors in general, and more particularly to a surveying instrument sensor utilizing two two-axis flexure suspended gyros in a rate capture and gimbal stabilized mode for oil well pipe surveying.

In oil well pipe surveying, it is necessary to obtain accurate information concerning the path of the pipe down to depths of 20,000 to 30,000 feet. The typical manner of accomplishing such surveying has been to measure the tilt angle of the pipe at discrete depths as the sensor package is lowered into a well. Traditionally, geographic heading has been provided through the use of a miniature directional gyroscope. The drift of such a gyroscope is enchanced by calibration at each measurement level.

The primary disadvantages of such a technique are that it provides inadequate accuracy, requires excessive measurement times and exhibits a short instrument life, particularly when applied to deep wells of 20,000 to 30,000 feet depth, in which cases ambient temperatures of up to 350° F. can be encountered.

Thus, the need for an improved surveying instrument sensor which is capable of quickly providing surveying data for deep wells is evident.

SUMMARY OF THE INVENTION

The present invention provides such a surveying instrument. Essentially it comprises two major subassemblies contained within sealed housing. These are a mechanical assembly and an electronics assembly. The mechanical assembly utilizes two Gyroflex® two-degree-of-freedom gyros, mounted to a gimbal. The gimbal is supported at its ends by preloaded bearings which are packaged in a resolver transmitter assembly, and in a DC torque motor, respectively. The resolver and torquer housings are mechanically secured to the inner wall of a 3" diameter stainless steel pipe.

The gimbal assembly has unlimited rotational freedom about the pipe axis. Electrical signals and power are conducted through a slip ring/brush block assembly.

The mechanical assembly is sealed and terminates in an electrical connector which permits it to interface with an electronics assembly, comprising two single sided aluminum cards, approximately 30" long, mounted on an aluminum web with the assembly secured to an inner wall section of a 3" diameter stainless steel pipe, which couples with the mechanical assembly on one end and the remainder of the instrument probe on the other.

The instrument sensor provides incremental angular information about two axes normal to the axial centerline of the well pipe to be surveyed. By integrating a continuous tilt information with depth, it is possible to obtain a survey of the offset position of the well. Tilt information is provided by a rate gyro positioned in azimuth by a null-seeking azimuth gyro on the azimuth gimbal. In other words, the azimuth gyro is used to drive the gimbal torque motor in a null-seeking stabilization loop to keep the gimbal and the other gyro constantaly pointed in a fixed, pre-selected direction regardless of twists or turns of the hole, drill pipe probe, or cable. The other gyro is mounted with its gyroscopic spin axis along the gimbal axis and is operated in a digital rate captured mode permitting the gyro pickoff displacement sensor signals to be directed through a rate capture amplifier to produce accurately scaled current pulses of proper polarity to torquing circuits within the gyro. Outputs from the amplifiers provide pulse outputs representing increments of tilt angle through which the gyro has been displaced. Because the heading of the gyro is held constant by the first gyro, the direction of tilt displacement angle outputs can be related geographically on a map. With continuous accurate information of this type, the tilt of a well pipe can be recorded "on the fly" and is limited only by the speed at which the probe may be lowered into the well. This gives an important advantage of speed and accuracy at which the angular change can be measured. In turn, the time required to complete a survey is minimized, not only lowering the operational cost but minimizing the time which the probe must spend in the well, particularly the time it must spend at higher temperatures near the bottom of the well. As a result the present invention provides improved accuracy and extended instrument operational life.

The gyros used herein have previously been typically used in navigational systems and thus, the type of accuracy obtained is the degree of accuracy obtainable in inertial navigation systems. By using a digitally captured rate gyro for tilt measurements, a smaller size than can be obtained with multigimballed devices is achieved, there is an insensitivity to lateral accelerations which prevent leveling devices from being continuously monitored, and convenient high resolution digital angle integration becomes possible. The incorporation of a gyro stabilized gimbal which isolates the tilt measuring units from rotations of the probe about the pipe axis, and maintains the tilt sensing axis in a fixed direction has a major advantage over a three-axis strap-down package in that it eliminates the heading uncertainty resulting from scale factor errors which would accumulate over the many uncontrolled revolutions of the sensor probe as it passes down the pipe. In other words, although one could also sense changes in the heading as the sensor probe rotates, as it is being lowered down the pipe with an additional gyro, the gimbal system of the present invention is superior in that it eliminates errors which would be associated with such a system.

DETAILED DESCRIPTION OF THE INVENTION

Figure 1:
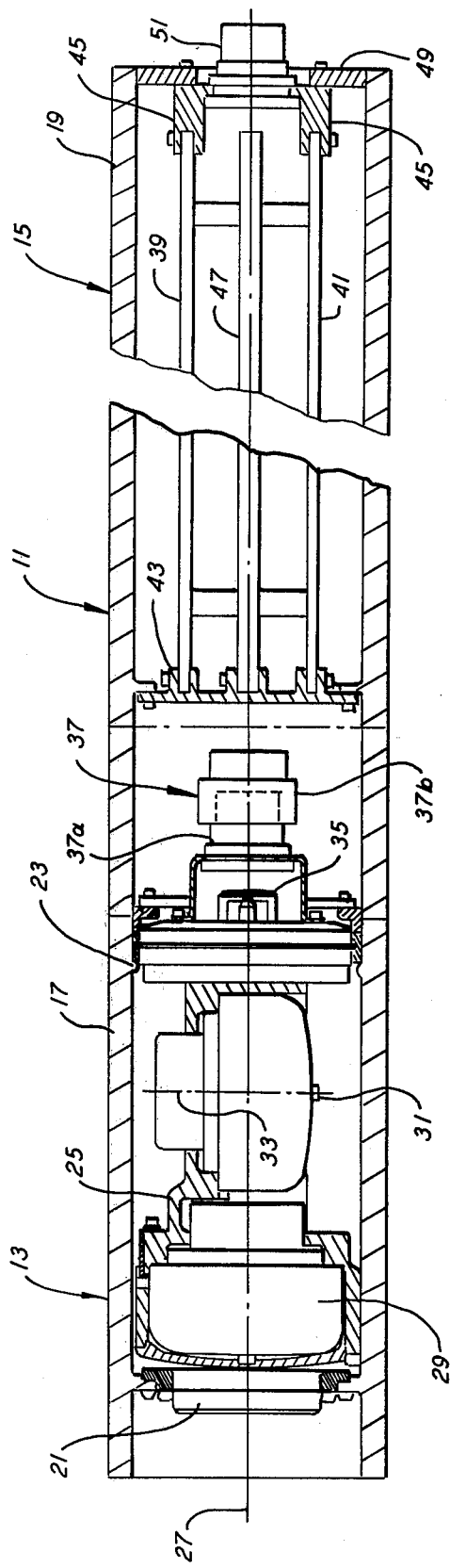
FIG. 1 is a cross-sectional view of the sensor according to the present invention.

FIG. 1 is a cross-sectional view through the surveying instrument of the present invention. The surveying instrument 11 comprises two subassemblies 13 and 15 respectively. Subassembly 13 is a mechanical subassembly and subassembly 15 an electronic subassembly. Each of the assemblies is disposed within a section of 3" stainless steel pipe, the pipe sections being designated 17 and 19 respectively. The mechanical unit within the pipe section 17 include a resolver transmitter 21 mounted at one end of the pipe section and a torquer 23 mounted at the other end of the pipe section. A gimbal 25 is supported at its ends by means of preloaded bearings packaged within the resolver transmitter 21 and the torquer 23. The gimbal is thus supported for rotation about the axis 27 of the instrument. This is an axis through the center of the two pipe sections 17 and 19. Mounted to the gimbal 25 are two gyros 29 and 31, respectively. Gyro 29 has its spin axis aligned with the axis 27 and gyro 31 has its spin axis 33 at right angles thereto. At the end of the pipe section 17, mounted to the torquer 23, is a slip ring and brush block assembly 35 and an electrical connector 37. Electrical leads from the resolver 21 and the gyros 29 and 31 along with the torquer 23 are brought out through the slip ring/brush block assembly to the connector 37. In the illustrated embodiment, this is a 32 conductor slip ring/brush block assembly. The connector has a male portion 37a and a female portion 37b. The leads from the brush block assembly 35 are brought into the male connector portion 37a. Leads are brought from the female connector portion 37b to the electronic assembly 15 within the pipe section 19.

Assembly 15 includes two single sided aluminum cards 39 and 41 having mounted thereon the necessary amplifiers, integrators, etc. These are aproximately 30" long, and are mounted to an aluminum web 43 at one end of the pipe section 19, and to appropriate supports 45 at the other end. A central supporting structure 47 between the cards is also provided. The supports 45, are mounted to a circular end plate 49 which is screwed into the end of the pipe section 19 and which retains an output connector 51. This permits coupling out necessary signals through a cable which is lowered along with the probe and also coupling into other probe sections which may be required for other purposes, e.g., temperature, measurement, etc. It also permits coupling power into the printed circuit cards 39 and 41 and to the gyros 29 and 31. The gyros 29 and 31 are sold under the name Gyroflex ® by the Kearfott Division of the Singer Company. These gyros are described in more detail in U.S. Pat. Nos. 3,354,726 and 3,438,270.

Figure 2:
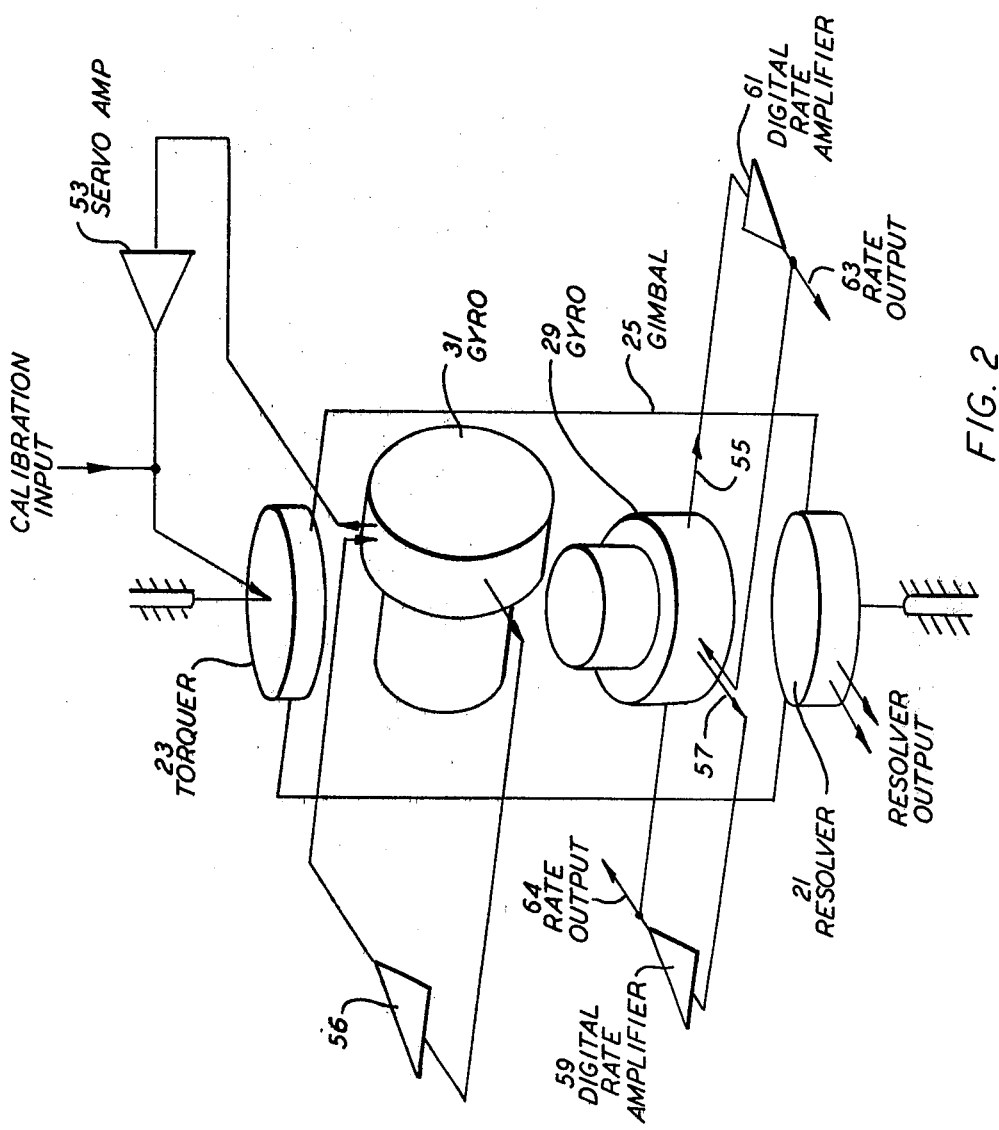
FIG. 2 is a perspective block diagram of the system of FIG. 1.

FIG. 2 is a block diagram perspective view of the system of the present invention. When it is desired to use the probe, the probe will be inserted into the opening of the well pipe to be surveyed, and power applied to bring the gyros up to speed and power the electronic circuits. The first thing that must take place is a calibration or alignment. This is the purpose of the resolver. The resolver output will, in conventional fashion, indicate the orientation of the gimbal 25, and thus the orientation of the spin axis of the gyro 31. It will be desirable, for example, to have the spin axis of the gyro 31 point North as a reference. Thus, once the surveying instrument is in place signals will be supplied to the torquer 5 to position the gimbal 25 so that it is pointing North, for example. Once it is so positioned during initial calibration, the gimbal will be maintained in this position despite any twisting or turning of the pipe sections 17 and 19 as the instrument is lowered. Each of the gyros is a two-axis gyro as described in the aforementioned U.S. patents. Each of the sensitive axis of the gyro, i.e., the two-axes orthogonal to each other and to the spin axis, are provided with a sensor and with a torquer as the body on which the gyro is mounted rotates. This rotation is sensed by the sensor and an appropriate torquer used to bring the gyro back to a null position. As illustrated by FIG. 2, the output of the sensing axis of the gyro 31 which is aligned with the axis of the instrument is provided as in input to a servo amplifier 53 which drives the torquer 23. Thus, when the gyro 31 senses a rotation of the instrument, i.e., the pipe section 17, about its axis, this signal is properly conditioned in the amplifier 53, and is used to drive the torquer to bring the gimbal 25 back to a null so that, for example, the spin axis of the gyro 31 always points North. The other sensing axis of this gyro is simply captured back on itself through an amplifier 56. What the gyro 31 does is to insure that the signals out of the gyros 29 are always related to a known reference. In other words, the sensing axis of gyro 29 designated as 55 on the figure, will, for example always be pointing North and the sensing axis 57 for example, always pointing East. Thus, rotations about these axis can thus be accurately plotted. This gyro is operated in a rate capture mode about both of the axes 55 and 57. Thus, the output from the axis 57 is coupled through a digital rate amplifier 59 back to the torquer for the axis 55. Similarly, the output of the sensor for axis 55 is coupled through a digital rate amplifier 61, the output of which is coupled to the torquer for the axis 57. In general terms, what this does, since torquing causes presession about an axis 90° from the point where the torque is applied, is to cause the gyro to be rate captured. In other words, if there is a movement about the axis 55, there is a movement within the gyro which is sensed, i.e., a gyro gimbal moves with respect to the gyro casing. This is sensed and is provided as an input to the amplifier 61 which then causes a torque to be applied to the other axis so as to restore the gimbal within the gyro to its null position with respect to the gyro casing. However, in doing so a rate output signal is developed, preferably a digital rate output signal which is taken off on line 63. Similarly, the rate output for the other axis is taken off on line 64. These outputs are then provided out through the connector 51 of FIG. 1 to appropriate recording equipment above the ground to be used in making an accurate map. It is noted, that the amplifiers 53, 56, 61 and 59 are all mounted on the electronic boards 39 and 41 along with other appropriate, conventional electronic equipment.

Figure 3:
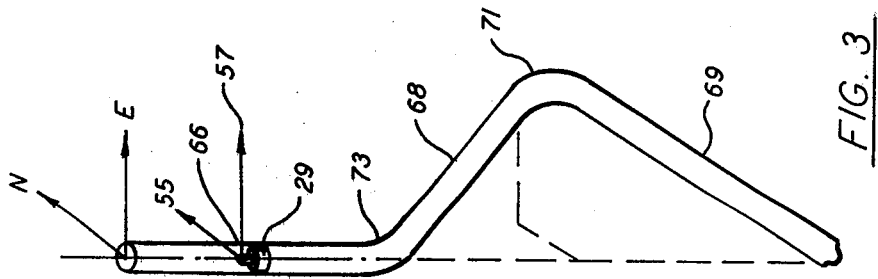
FIG. 3 is a view illustrating operation of the present invention.

An example of how the sensor of the present invention works is illustrated in FIG. 3, which shows an exaggerated curved path of a well pipe in perspective view. Also shown are reference directions North and East. Shown is a section 66 which goes vertically downward followed by a section 68 which deviates to the North and East and finally a section 69 which, from the point 71 moves South and West. Shown schematically within the pipe 66 is the gyro 29 with its axes 55 and 57. During travel over the section 66 of the pipe, there will be no output from the gyro 29 since there is no rotation about the axis 55 or 57 and thus the outputs on line 63 and 64 of FIG. 2 will be zero. However, when the gyro 29 reaches the curved section 73 of the pipe there will be an output. Consider just the movement to the North. As the instrument moves into the curved section the pipe section 73 and the gyro 29 will begin to make a turn to the North. The gyro wants to stay exactly where it is so that there will be a movement of the gimbals inside with respect to the casing and a resulting output along the axis 57. This will immediately result in an input to the axis 55 to restore the gimbal within the gyro. However, the signal on line 64 will be transmitted to the surface. This signal will be a rate signal, i.e., an indication of so many degrees per unit time. By integrating this rate signal, the angle through which the gyro moves can be determined. At the same time, at the surface, from a knowledge of how much cable has been paid out, the depth at which the rotation occurs is known. Thus, it is possible to plot that at a given depth the sensor turned through a given angle. The same thing would happen with respect to the movement in an easterly direction which would be sensed about the axis 55. Once the straight section 68 is being traversed, there will be no change, again the rate output will be zero. However, the angle is known in both dimensions and the direction can still be plotted. Then, when the bend 71 is encountered there will again be outputs from both axes indicating a rotation to the West and to the South. This also can be integrated to obtain an angle and plotted as a function of distance. Similarly, when the section 69 is traversed there will be no output. Such surveying continues until the bottom of the well is reached. At that time, an accurate plot of the path from the top to the bottom of the well will have been obtained. This can be done as quickly as it is possible to lower the sensor down the pipe since the measurements are made "on the fly", there being no need to stop at various points and measure tilt as was done in the prior art. Furthermore it will be recognized by those skilled in the art that, with appropriate computer plotting equipment, one can directly obtain a plot or map in two dimensions simply by feeding into an appropriate computer the rate information on lines 63 and 64 along with appropriate distance information. Alternatively, the information from line 63 and 64 along with distance information can simply be recorded and stored and plotting carried out later on.

What is claimed is:

1. A surveying instrument sensor comprising:
   (a) a sealed casing comprising first and second sections of pipe of a size permitting it to be lowered into a well pipe or the like containing within said first section:
      (i) a gimbal supported for rotation within said casing;
      (ii) a torquer coupled to rotate said gimbal;
      (iii) a first two-axis flexure suspended gyro supported on said gimbal with its spin axis perpendicular to the axis of said gimbal and one of its sensitive axes aligned with the axis of said gimbal;
      (iv) a second two-axis flexure suspended gyro supported on said gimbal with its spin axis perpendicular to the axis of said gimbal and one of its sensitive axes aligned with the axis of said gimbal;
      (v) means for coupling the output of said first gyro to said torquer to form a gimbal stabilized loop;
      (vi) means for coupling the outputs and torquing inputs of said second gyro into rate capture loops;
      (vii) means for obtaining from said rate captured loops rate output signals; and said second section of pipe having therein electronic circuit boards;
   (b) a slip ring/brush block mounted respectively to said gimbal and said casing for coupling signals to and from said torquer and said gyros and said circuit boards; and
   (c) means for connecting a cable to an end of said casing to remotely supply power thereto and receive signals therefrom as said casing is lowered into a well pipe or the like.

2. Apparatus according to claim 1 and further including a connector having a female portion and a male portion, one of said portions receiving the outputs of said slip ring/brush block assembly and the other the connections to said circuit boards.

3. Apparatus according to claim 1 wherein said means for coupling said first gyro and gimbal stabilized loop comprise a servo amplifier obtaining its input from the sensitive axis of said first gyro and providing its output to said torquer.

4. Apparatus according to claim 3 wherein said amplifier is mounted on one of said circuit boards.

5. Apparatus according to claim 1 wherein said means for coupling said second gyro in a rate capture loop comprises first and second amplifiers receiving inputs respectively from the outputs of the sensitive axes of said second gyro and providing their outputs to the torquers of said gyro, the outputs of said amplifiers providing the rate output of said system.

6. Apparatus according to claim 5 wherein said amplifiers comprise digital rate amplifiers.

7. Apparatus according to claim 6 wherein said amplifiers are mounted on one of said circuit boards.

8. A surveying instrument sensor for surveying well pipes comprising:
   (a) a first section of pipe;
   (b) a gimbal disposed for rotation therein;
   (c) a torquer for rotating said gimbal;
   (d) first and second two-axis flexure suspended gyros mounted on said gimbal, one of said gyros having its spin axis aligned with the axis of said gimbal and the other having its spin axis perpendicular thereto;
   (e) a brush block assembly coupled respectively to said pipe section and said gimbal;
   (f) each of said gyros having first and second sensitive axis outputs and first and second torquer inputs, the inputs and outputs of said gyros and the input to said torquer coupled through said slip ring/brush block assembly;
   (g) a connector disposed at said brush block assembly receiving inputs from the other of said slip rings or brush block;
   (h) a second pipe section adapted to mate with said first pipe section;
   (i) a connector at said second pipe section for mating with said first connector;
   (j) at least one circuit board in said second pipe section having inputs and outputs coupled to said connector;
   (k) and a third connector for coupling signal and power out of said second pipe section to a cable which can be lowered into a well with said two pipe sections; and
   (l) said circuit board having thereon:
      i. first servo amplifier receiving as an input the output of the sensitive axis of said first gyro which is aligned with said gimbal axis and providing an output to said torquer to thereby establish operation of said first gyro in a gimbal stabilized mode insuring that said gimbal always is pointed in the same direction despite any rotation of said pipe sections;
      ii. a second amplifier receiving an output from one of the sensitive axis of the said second gyro and providing its output to the torquer for the other axis of said second gyro;
      iii. a third amplifier receiving an input from the other sensitive axis of said gyro and providing its output to the torquer for the one sensitive axis of said second gyro thereby placing the two sensitive axes of said second gyro in rate capture; and iv. outputs from said third and fourth amplifiers being coupled through said third connector, whereby from the rate information provided therefrom, along with the knowledge of the distance which said sensor has been lowered into said well pipe, an accurate plot of the path of said well pipe can be established.

9. Apparatus according to claim 8 and further including a resolver disposed within said first pipe section, said resolver and torquer being disposed at opposite ends thereof with said gimbal therebetween, said gimbal supported in preloaded bearings within said resolver and torquer, the connections to and from said resolver being coupled through said slip ring/brush block assembly, first and second connectors and third connector, whereby, prior to use, said gimbal can be aligned in a predetermined direction by operating said torquer and observing the output of said resolver.

* * * * *